(12) United States Patent
Langhoff

(10) Patent No.: US 10,195,933 B2
(45) Date of Patent: Feb. 5, 2019

(54) WHEEL SUSPENSION FOR A WHEEL OF AN AXLE OF A MOTOR VEHICLE

(71) Applicant: AUDI AG, Ingolstadt (DE)

(72) Inventor: Hans-Jürgen Langhoff, Lenting (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/816,762

(22) Filed: Nov. 17, 2017

(65) Prior Publication Data

US 2018/0147932 A1    May 31, 2018

(30) Foreign Application Priority Data

Nov. 29, 2016 (DE) .................. 10 2016 223 631

(51) Int. Cl.
*B60K 7/00* (2006.01)
*B60G 7/00* (2006.01)

(52) U.S. Cl.
CPC ............ *B60K 7/0007* (2013.01); *B60G 7/001* (2013.01); *B60G 7/008* (2013.01); *B60G 2200/422* (2013.01); *B60G 2204/148* (2013.01); *B60G 2204/182* (2013.01); *B60G 2300/50* (2013.01); *B60K 2007/0038* (2013.01); *B60K 2007/0092* (2013.01)

(58) Field of Classification Search
CPC ................................ B60K 7/0007; B60G 7/01
See application file for complete search history.

(56) References Cited

U.S. PATENT DOCUMENTS

2004/0112657 A1    6/2004  Ajiro et al.
2011/0127094 A1*   6/2011  Hamada .................. B60G 7/02
                                                         180/65.51

FOREIGN PATENT DOCUMENTS

| CN | 104129273 A | 11/2014 |
| DE | 102010023982 A1 | 2/2011 |
| DE | 102010012115 A1 | 9/2011 |
| DE | 102011080037 A1 | 1/2013 |
| DE | 102011121262 A1 | 6/2013 |
| EP | 2921331 A1 | 9/2015 |

OTHER PUBLICATIONS

German Search Report dated Aug. 29, 2017 of corresponding German application No. 102016223631.8; 8 pgs.

* cited by examiner

*Primary Examiner* — James A Shriver, II
*Assistant Examiner* — James J Triggs
(74) *Attorney, Agent, or Firm* — Maier & Maier, PLLC

(57) ABSTRACT

A wheel suspension for a wheel of an axle of a motor vehicle. A wheel hub, which is rotatably mounted in a wheel carrier, can be driven by an electric drive engine. The wheel carrier is rotatably mounted by at least one link about a pivot axis on the vehicle body. The electric drive engine and the link are rigidly connected to one another.

8 Claims, 2 Drawing Sheets

WHEEL SUSPENSION FOR A WHEEL OF AN AXLE OF A MOTOR VEHICLE

FIELD

The invention elates to a wheel suspension for a wheel of an axle of a motor vehicle.

BACKGROUND

A customary wheel suspension is known from DE 10 2010 012 115 A1. The disclosed wheel suspension comprises a wheel hub which is mounted via a steering arrangement on a chassis and/or mounted in an articulated manner on the body of the vehicle, as well as at least one electric machine by means of which the wheel hub can be driven, wherein the electric machine is mounted by means of another associated articulated steering arrangement, or a by means of a kinematically equivalent bearing for mounting on the chassis and/or on the superstructure.

SUMMARY

The objective of the invention is to further develop a wheel suspension for a wheel of an axle of a motor vehicle in such a way that an improved package of the electric drive motor is made possible, while the driving characteristics are maintained.

It is known that a rotatably mounted wheel hub can be driven by means of an electric drive motor in the wheel suspension for a wheel of an axle of a motor vehicle. In addition, the wheel carrier is rotatably mounted in a known manner via at least one link about a pivot axis on the motor vehicle body.

According to the invention, the electric drive motor is rigidly connected to the link. This embodiment proves to be advantageous as a very rigid design of the link is ensured, which has a particularly positive effect on the driving dynamics.

According to a first embodiment of the invention, the link and the electric drive motor, which is to say the link of the drive engine, are rigidly connected to each other by means of a force-fitting, form-fitting and/or material-fitting connection. In view of a simple assembly, it is in particular advantageous when the force-fitting connection is provided, for example with a screw connection of the housing of the drive engine to the link.

According to a particularly advantageous second embodiment of the invention it is provided that the electric drive engine is arranged in the link. In other words, this means that the housing of the electric drive motor and the link form an integral unit in one piece that is made of the same material. It is particularly advantageous in the case of this embodiment that the housing is provided with a greatly enlarged surface, which has a particularly positive effect on the cooling.

It is in this case preferred when the drive motor is positioned with respect to the link so that starting from the pivot axis and viewed in the longitudinal direction of the link, the following is valid about the pivot axis (S) of the electric drive motor with respect to the entire link length (L):

$$0 \leq \left| \frac{A}{L} \right| \leq 0,5$$

This ensures in an advantageous manner that the weight of the electric drive motor will be positioned very close to the pivot axis of the link, so that the moment of inertia of the electric drive engine remains as low as possible.

The chassis bearing forming the pivot axis can be in this case optionally formed on the electric drive engine, or on the link.

The electric drive engine can be preferably operatively connected to the wheel hub by means of a drive shaft which is connected to the drive engine in a manner resistant to bending. This has the effect that the drive shaft is designed so as to be pivotable with the electric drive engine, which is why joints are not required to realize bending angles.

According to another embodiment of the invention it is provided that the link and the electric engine, or more specifically the link and the housing of electric drive engine, are formed from different materials, in particular from steel, aluminum, plastic material or fiber composite materials. This makes it possible to design a lightweight construction.

Another preferred embodiment of the invention is characterized in that the wheel carriers are also designed as an integral component of the link. An integral component should be hereinafter understood so that the wheel carrier is formed directly on the link, and for example so that it is a structural unit formed in one piece. This makes it possible to provided a particularly compact construction having fewer individual components, as well as to provide a rigid design, which in turn has a positive influence on the driving dynamics.

BRIEF DESCRIPTION OF THE FIGURES

Further advantages and possible applications of the present invention will become apparent from the following description in conjunction with the embodiments illustrate in the drawings.

The drawings show the following.

DETAILED DESCRIPTION OF THE FIGURES

Figure 1:
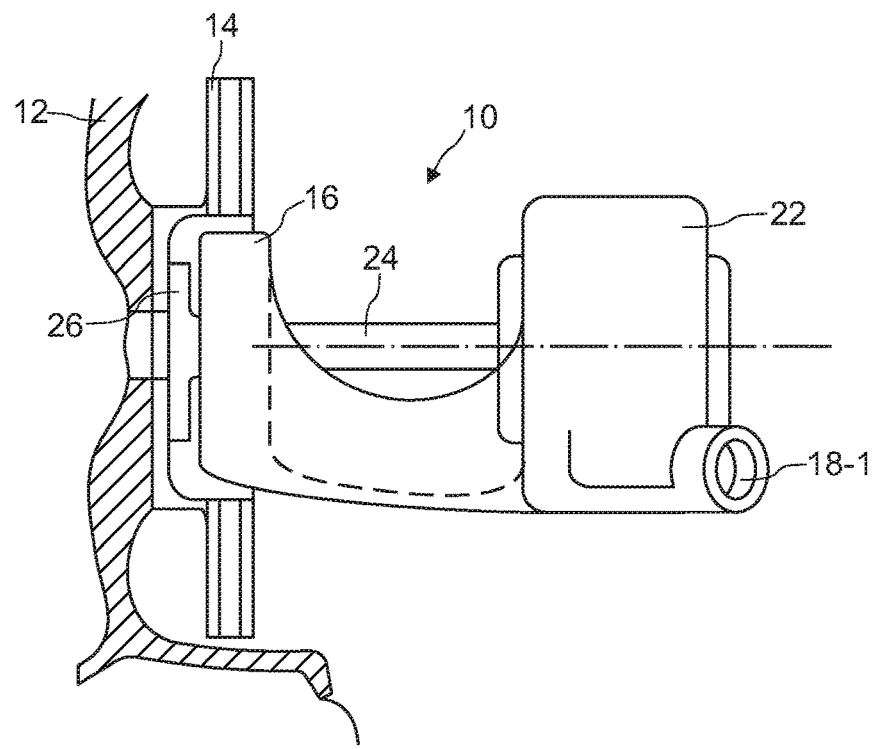
FIG. 1 a top view of a link of a wheel suspension according to the invention, FIG. 2 the link of FIG. 1 in a partial sectional illustration.
Figure 2:
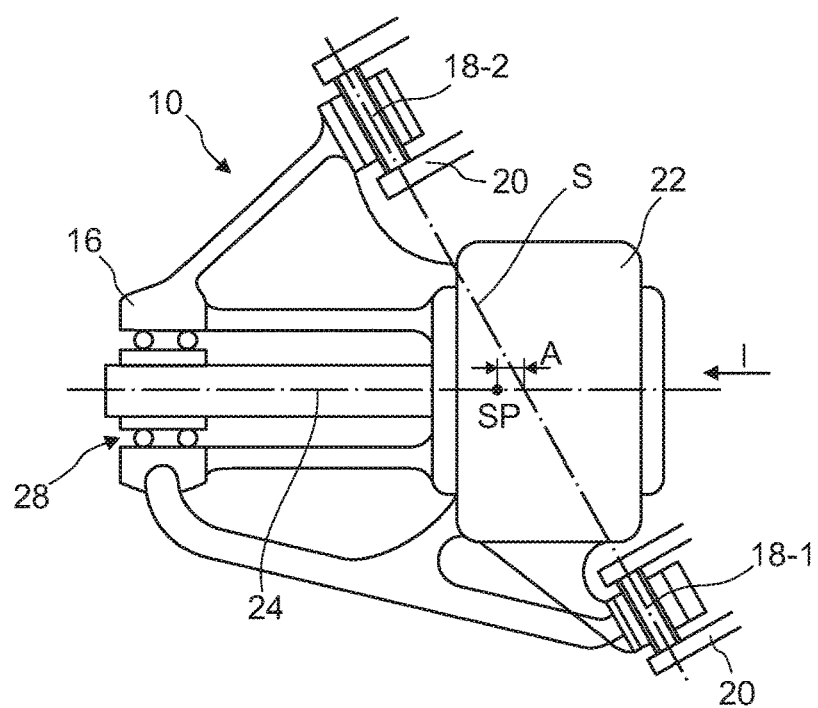
Figure 3:
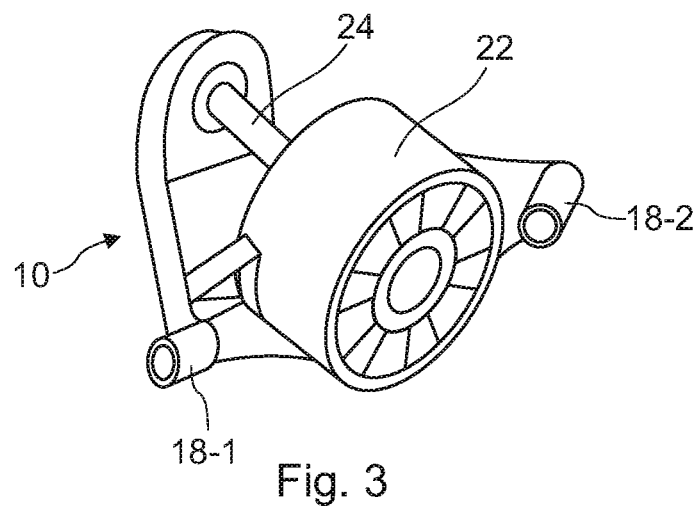
FIG. 3 the link of FIGS. 1 and 2 in an oblique view from above.

FIG. 1 through FIG. 3 shows a link 10 of a wheel suspension, not shown further here, for a wheel of an axle of a motor vehicle driven by means of a single drive.

The illustrated link 10 of the wheel suspension is a part of a link assembly, by means of a wheel rim 12 and wheel carrier 16 carrying a brake disk 14 are rotatably mounted by means of chassis bearings 18-1 and 18-2 about a pivot axis S on the motor vehicle motor vehicle body 20. The wheel carrier 16 illustrated in the embodiment as shown in FIG. 1 through FIG. 3 is in this case designed as an integral component of the link 10.

The individual drive associated with the wheel is in the present case designed in the form of an electric drive engine 22, which is operatively connected to a wheel hub 26 so as to be resistant to bending by means of a drive shaft 24 that is connected to drive engine 22. The wheel hub 26 is in this case preferably formed on a wheel bearing 28 pressed into the wheel carrier 16, in particular on the inner ring of the wheel bearing 28. The wheel hub can be designed so as to be pivotable with respect to the wheel carrier 16 in a manner not shown in detail here, see for example DE 10 2011 121 262 or DE 10 2010 012 115.

As shown further in FIG. 1 through 3, the electric drive engine 22 is in this case rigidly connected to the link 10. In the present case, the electric drive engine 22 is integrated in the link 10, i.e. the housing of the electric drive motor, which is designated as a whole by the reference number 22, and the link 10 for a structural unit that made in one piece and from the same material.

In addition, as can be seen in particular in FIG. 2, the electric drive engine 22 is positioned in such a way so that the moment of inertia SP of the electric drive motor 22 is located in the immediate vicinity of the pivot axis S, and so that with a rebound movement in and out of the link 10 about the pivot axis S, the moment of inertia of the electric drive engine 22 will remain as small as possible.

A particularly advantageous feature of the rigid connection of the electric drive engine 22 to the link 10 is that a particularly space-saving arrangement is provided, which is easy to "package" and which has a positive effect on the driving dynamics as a result of the rigid design of the link.

A further advantage of the integrated arrangement of the drive motor 22 in the link 10 illustrated in FIG. 1 through FIG. 3 is that the surface of the housing of the electric drive motor has been greatly increased, which results in improved passive cooling.

Figure 4:
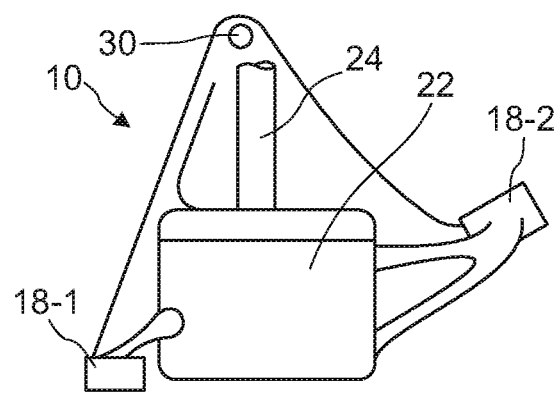
FIG. 4 a top view of another link of a wheel suspension according to the invention, and FIG. 5 the link of FIG. 4 in a front view.
Figure 5:
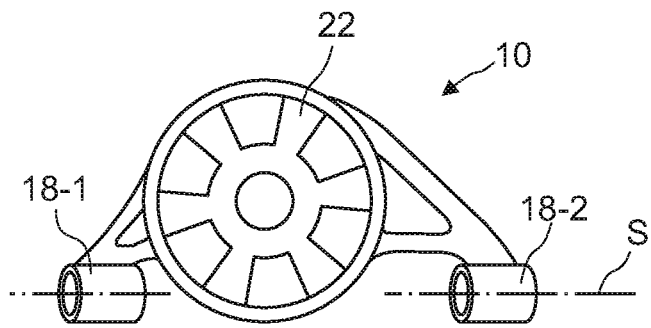

The embodiment of the link 10 illustrated in FIGS. 4 and 5 substantially corresponds to the embodiment illustrated in FIG. 1 through 3. This means that also according to this embodiment, the electric drive motor 22 is arranged so that it is integrated in the link 10, which is to say that the housing that is designated as a whole by the reference number 22 and the link 10 form a structural unit made in one piece from the same material.

As can be further seen in particular in FIG. 4, the link 10 is designed in the present case as a triangular link, which is mounted on the wheel carrier so as to be pivotable via an outer bearing point 30, not shown here, which is to say that the link 10 and the wheel carrier are designed as two separate components according to this embodiment.

The invention claimed is:

1. A wheel suspension for a wheel of an axle of a motor vehicle comprising:
    a wheel hub, which is rotatably mounted in a wheel carrier, configured to be driven via an electric drive motor, and wherein the wheel carrier is rotatably mounted by at least one link about a pivot axis on the motor vehicle body, wherein the electric drive motor and the link are rigidly connected to one another, and
    wherein the electric drive motor is positioned in such a way that viewed from the pivot axis and in a longitudinal direction of the link, the distance (A) of the center of gravity of the electric drive engine from the pivot axis, relative to the entire link length (L) of the link is:

$$0 \le \left|\frac{A}{L}\right| \le 0,5.$$

2. The wheel suspension according to claim 1, wherein the link and the electric drive motor are rigidly connected to one another by a force-fitting, form-fitting and material-fitting connection.

3. The wheel suspension according to claim 1, wherein the electric drive engine is integrated in the link.

4. The wheel suspension according to claim 3, wherein the housing of the electric drive motor and the link form an integral structural unit that is made of the same material.

5. The wheel suspension according to claim 1, wherein the link is rotatably mounted by chassis bearings on the vehicle body, wherein the chassis bearings are arranged at the electric drive motor or at the link.

6. The wheel suspension according to claim 1, wherein the electric drive motor is connected with an operative connection to the wheel hub via a drive shaft in a manner that is resistant to bending.

7. The wheel suspension according to claim 1, wherein the link and the electric drive motor are formed from different materials.

8. The wheel suspension according to claim 1, wherein the wheel carrier is formed as an integral component of the link.

\* \* \* \* \*